United States Patent
Bidram et al.

(10) Patent No.: US 10,645,882 B1
(45) Date of Patent: May 12, 2020

(54) METHOD AND APPARATUS FOR PERFORMING PRUNING OPERATIONS USING AN AUTONOMOUS VEHICLE

(71) Applicant: ADVANCED INTELLIGENT SYSTEMS INC., Burnaby (CA)

(72) Inventors: Farhang Bidram, West Vancouver (CA); Vahid Mehrabi, Coquitlam (CA)

(73) Assignee: Advanced Intelligent Systems Inc., Burnaby, British Columbia (CA)

( * ) Notice: Subject to any disclaimer, the term of this patent is extended or adjusted under 35 U.S.C. 154(b) by 0 days.

(21) Appl. No.: 16/510,070

(22) Filed: Jul. 12, 2019

Related U.S. Application Data (60) Provisional application No. 62/751,868, filed on Oct. 29, 2018.

(51) Int. Cl.
  *A01G 3/04* (2006.01)
  *B25J 11/00* (2006.01)
  (Continued)

(52) U.S. Cl.
  CPC ........... *A01G 3/0435* (2013.01); *A01G 3/047* (2013.01); *B25J 5/007* (2013.01); *B25J 9/1679* (2013.01); *B25J 11/0055* (2013.01); *B25J 13/086* (2013.01); *G05D 1/0088* (2013.01); *G05D 2201/0201* (2013.01)

(58) Field of Classification Search
  CPC .............................. A01G 3/0435; A01G 3/047
  See application file for complete search history.

(56) References Cited

U.S. PATENT DOCUMENTS

| 4,004,677 A | 1/1977 | Heier et al. |
| 4,382,332 A * | 5/1983 | Dominge ................. A01G 3/00 30/379 |

(Continued)

FOREIGN PATENT DOCUMENTS

| CA | 2622940 A1 | 3/2007 |
| CN | 1611331 A | 5/2005 |

(Continued)

OTHER PUBLICATIONS

International Search Report and Written Opinion of the International Searching Authority issued by the Canadian Intellectual Property Office in connection with International Patent Application No. PCT/CA2017/000057, dated Jul. 25, 2017, 14 pages.

(Continued)

*Primary Examiner* — Kristen C Hayes (57) ABSTRACT

An autonomous vehicle apparatus and method for performing pruning operations on a plant being cultivated in a container is disclosed. The apparatus includes a wheeled chassis operably configured to autonomously navigate to a location of the container within a workspace. The apparatus also includes a plant support operable to receive and secure the container in an upright condition for rotation about a vertical axis extending generally vertically through the container and the plant. The apparatus further includes a manipulator mounted to the vehicle and operable to grasp and load the container onto the plant support, and a pruning tool mounted on the vehicle and disposed to prune the plant while the container is rotated on the plant support.

22 Claims, 7 Drawing Sheets

(51) Int. Cl.
  *G05D 1/00* (2006.01)
  *B25J 9/16* (2006.01)
  *B25J 13/08* (2006.01)
  *A01G 3/047* (2006.01)
  *B25J 5/00* (2006.01)

(56) References Cited

U.S. PATENT DOCUMENTS

| | | |
|---|---|---|
| 4,536,690 A | 8/1985 | Belsterling et al. |
| 4,600,355 A | 7/1986 | Johnson |
| 4,621,562 A | 11/1986 | Carr et al. |
| 4,636,137 A | 1/1987 | Lemelson |
| 4,678,390 A | 7/1987 | Bonneton et al. |
| 4,698,775 A | 10/1987 | Koch et al. |
| 4,829,840 A | 5/1989 | Torii et al. |
| 5,017,084 A | 5/1991 | Lemelson |
| 5,358,568 A | 10/1994 | Okano et al. |
| 5,491,540 A | 2/1996 | Hirst |
| 5,503,513 A | 4/1996 | Detriche |
| 5,523,662 A | 6/1996 | Goldenberg et al. |
| 5,550,953 A | 8/1996 | Seraji |
| 5,682,313 A | 10/1997 | Edlund et al. |
| 5,737,500 A | 4/1998 | Seraji et al. |
| 5,787,322 A | 7/1998 | Sass et al. |
| 5,809,375 A | 9/1998 | Owens, Jr. et al. |
| 5,887,229 A | 3/1999 | Sass et al. |
| 6,151,876 A * | 11/2000 | Van Der Burg ..... A01G 3/0435 56/1 |
| 6,473,371 B1 | 10/2002 | White |
| 6,507,163 B1 | 1/2003 | Allen |
| 6,898,484 B2 | 5/2005 | Lemelson et al. |
| 7,240,879 B1 | 7/2007 | Cepollina et al. |
| 7,496,314 B2 | 2/2009 | Lombardo et al. |
| 8,010,230 B2 | 8/2011 | Zini et al. |
| 8,099,191 B2 | 1/2012 | Blanc et al. |
| 8,160,747 B1 | 4/2012 | Blackwell et al. |
| 8,229,595 B2 | 7/2012 | Seelinger et al. |
| 8,229,622 B2 | 7/2012 | Payne et al. |
| 8,360,178 B2 | 1/2013 | Goldenberg et al. |
| 8,588,976 B2 | 11/2013 | Mangaser et al. |
| 8,676,425 B2 | 3/2014 | Jones et al. |
| 8,915,692 B2 | 12/2014 | Grinnell et al. |
| 8,958,916 B2 | 2/2015 | Setrakian et al. |
| 9,114,440 B1 | 8/2015 | Colucci et al. |
| 9,238,304 B1 | 1/2016 | Bradski et al. |
| 9,254,897 B2 | 2/2016 | Andrieu et al. |
| 9,440,352 B2 | 9/2016 | Meier et al. |
| 9,486,921 B1 | 11/2016 | Straszheim et al. |
| 9,505,136 B1 | 11/2016 | Nusser et al. |
| 9,751,693 B1 | 9/2017 | Battles et al. |
| 9,770,825 B2 | 9/2017 | Goldenberg et al. |
| 9,889,562 B1 | 2/2018 | Rembisz |
| 9,902,560 B2 | 2/2018 | Porat |
| 9,919,872 B2 | 3/2018 | Khodl et al. |
| 9,952,589 B1 | 4/2018 | Brazeau |
| 9,958,854 B2 | 5/2018 | Vasquez et al. |
| 10,059,006 B2 | 8/2018 | Rublee |
| 10,065,314 B2 | 9/2018 | Tian et al. |
| 10,108,185 B1 | 10/2018 | Theobald |
| 10,144,128 B1 | 12/2018 | Kolb et al. |
| 10,214,400 B2 | 2/2019 | High et al. |
| 10,336,592 B2 | 7/2019 | Atchley et al. |
| 2004/0243280 A1 | 12/2004 | Bash et al. |
| 2005/0222713 A1 | 10/2005 | Kawabe et al. |
| 2008/0282494 A1 | 11/2008 | Won et al. |
| 2009/0157224 A1 | 6/2009 | Blanc et al. |
| 2011/0010007 A1 | 1/2011 | Sarh et al. |
| 2011/0172850 A1 | 7/2011 | Paz-Meidan et al. |
| 2011/0301757 A1 | 12/2011 | Jones et al. |
| 2012/0029697 A1 | 2/2012 | Ota et al. |
| 2013/0054024 A1 | 2/2013 | Bruemmer et al. |
| 2013/0110281 A1 | 5/2013 | Jones et al. |
| 2013/0181544 A1 | 7/2013 | Comins et al. |
| 2014/0363264 A1 | 12/2014 | Gowa et al. |
| 2015/0050111 A1 | 2/2015 | Townsend |
| 2015/0066281 A1 | 3/2015 | Allen et al. |
| 2015/0151933 A1 | 6/2015 | Grinnell et al. |
| 2016/0075014 A1 | 3/2016 | Bruemmer |
| 2016/0101940 A1 | 4/2016 | Grinnell et al. |
| 2016/0150739 A1* | 6/2016 | Fisher ................. A01D 34/008 705/14.4 |
| 2016/0176638 A1 | 6/2016 | Toebes |
| 2016/0187886 A1 | 6/2016 | Jones et al. |
| 2016/0257212 A1 | 9/2016 | Thompson et al. |
| 2016/0259028 A1 | 9/2016 | High et al. |
| 2016/0259341 A1 | 9/2016 | High et al. |
| 2016/0259342 A1 | 9/2016 | High et al. |
| 2016/0259343 A1 | 9/2016 | High et al. |
| 2016/0259345 A1 | 9/2016 | McHale et al. |
| 2016/0260054 A1 | 9/2016 | High et al. |
| 2016/0260161 A1 | 9/2016 | Atchley et al. |
| 2016/0261698 A1 | 9/2016 | Thompson et al. |
| 2016/0318494 A1 | 11/2016 | Henry et al. |
| 2016/0349758 A1 | 12/2016 | Wang et al. |
| 2017/0009417 A1 | 1/2017 | High et al. |
| 2017/0010608 A1 | 1/2017 | High et al. |
| 2017/0010609 A1 | 1/2017 | High et al. |
| 2017/0020354 A1 | 1/2017 | High et al. |
| 2017/0024806 A1 | 1/2017 | High et al. |
| 2017/0183159 A1 | 6/2017 | Weiss |
| 2017/0248966 A1 | 8/2017 | Lutz et al. |
| 2017/0283171 A1 | 10/2017 | High et al. |
| 2017/0349376 A1 | 12/2017 | Porat |
| 2018/0001479 A1 | 1/2018 | Li et al. |
| 2018/0127999 A1 | 5/2018 | Durvasula et al. |
| 2018/0162469 A1 | 6/2018 | Blankespoor et al. |
| 2018/0281143 A1 | 10/2018 | Albert et al. |
| 2018/0349843 A1 | 12/2018 | High et al. |
| 2018/0354143 A1 | 12/2018 | Dorfman |
| 2018/0361571 A1 | 12/2018 | Georgeson et al. |

FOREIGN PATENT DOCUMENTS

| | | |
|---|---|---|
| CN | 104133472 A | 11/2014 |
| CN | 205219095 | 5/2016 |
| CN | 105729441 A | 7/2016 |
| CN | 106002932 A | 10/2016 |
| CN | 205694483 | 11/2016 |
| CN | 106272415 A | 1/2017 |
| CN | 106416930 A | 2/2017 |
| CN | 107753105 A | 3/2018 |
| CN | 108335458 A | 7/2018 |
| DE | 3416435 A1 | 11/1985 |
| DE | 102015220066 A1 | 4/2017 |
| DE | 102016009548 B3 | 8/2017 |
| DE | 102016222255 B3 | 4/2018 |
| DE | 102017009939 A | 4/2019 |
| EP | 0304342 A2 | 2/1989 |
| EP | 0388288 A1 | 9/1990 |
| EP | 0441397 A1 | 8/1991 |
| EP | 0616275 B1 | 9/1998 |
| EP | 2147757 A1 | 1/2010 |
| EP | 2296071 A1 | 3/2011 |
| EP | 2631040 A2 | 8/2013 |
| EP | 2546711 B1 | 5/2018 |
| EP | 3415284 A2 | 12/2018 |
| EP | 3418245 A1 | 12/2018 |
| FR | 2492784 | 4/1982 |
| JP | S6449237 A | 2/1989 |
| JP | H04310382 A | 11/1992 |
| JP | H05201547 A | 8/1993 |
| JP | 3188953 B2 | 7/2001 |
| JP | 2009196381 A | 9/2009 |
| JP | 5900462 B2 | 4/2016 |
| JP | 6531968 B2 | 6/2019 |
| KR | 20070011495 A | 1/2007 |
| KR | 101059929 B1 | 8/2011 |
| WO | 2004103864 A1 | 7/2006 |
| WO | 2013066534 A1 | 5/2013 |
| WO | 2015038705 A1 | 3/2015 |
| WO | 2017197305 A1 | 11/2017 |
| WO | 2018045448 A1 | 3/2018 |
| WO | 2018114041 A1 | 6/2018 |
| WO | 2018140471 A1 | 8/2018 |

(56) References Cited

FOREIGN PATENT DOCUMENTS

| WO | 2018162491 A1 | 9/2018 |
|----|---------------|--------|
| WO | 2018170102 A1 | 9/2018 |
| WO | 2018205198 A1 | 11/2018 |
| WO | 2018213164 A1 | 11/2018 |
| WO | 2018213931 A1 | 11/2018 |
| WO | 2019028226 A1 | 2/2019 |
| WO | 2019055281 A3 | 3/2019 |

OTHER PUBLICATIONS

International Search Report and Written Opinion of the International Searching Authority issued by the Canadian Intellectual Property Office in connection with International Patent Application No. PCT/CA2019/000022, dated May 3, 2019, 7 pages.
International Search Report and Written Opinion of the International Searching Authority issued by the Canadian Intellectual Property Office in connection with International Patent Application No. PCT/CA2019/050311, dated May 24, 2019, 12 pages.
Kielhofer, Simon, European Patent Office, Extended European Search Report, in connection with related European Patent Application No. 17847836, dated Aug. 20, 2019, 8 pages.
International Search Report and Written Opinion of the International Searching Authority issued by the Canadian Intellectual Property Office in connection with International Patent Application No. PCT/CA2019/051525, dated Feb. 3, 2020, 8 pages.

* cited by examiner

METHOD AND APPARATUS FOR PERFORMING PRUNING OPERATIONS USING AN AUTONOMOUS VEHICLE

RELATED APPLICATIONS

This application claims the benefit of provisional patent application 62/751,868 entitled "METHOD AND APPARATUS FOR PLANT TRIMMING USING AN AUTONOMOUS MOBILE WORK STATION", filed on Oct. 29, 2018 and incorporated herein by reference in its entirety.

BACKGROUND

1. Field

This disclosure relates generally to automated vehicles more particularly to an autonomous vehicle for performing pruning operations on plants being cultivated in containers.

2. Description of Related Art

Autonomous or semi-autonomous vehicles may be used to carry out operations in an industrial or commercial workspace. Autonomous vehicles are typically configured with an ability to navigate and to detect objects within the workspace and may perform handling operations that may otherwise be performed manually by human workers. In the example of a plant nursery, plants are typically cultivated in containers, which may be very numerous and also heavy to move. Operations such as pruning of the plant may be required one or more times through the cultivation cycle and when performed manually by a human is labor intensive and tedious. Automated pruning solutions exist but generally involve a manual labor component. There remains a need for methods and apparatus for performing pruning operations.

SUMMARY

In accordance with one disclosed aspect there is provided an autonomous vehicle apparatus for performing pruning operations on a plant being cultivated in a container. The apparatus includes a wheeled chassis operably configured to autonomously navigate to a location of the container within a workspace. The apparatus also includes a plant support operable to receive and secure the container in an upright condition for rotation about a vertical axis extending generally vertically through the container and the plant. The apparatus further includes a manipulator mounted to the vehicle and operable to grasp and load the container onto the plant support, and a pruning tool mounted on the vehicle and disposed to prune the plant while the container is rotated on the plant support.

The plant support may include a support surface sized to receive and support a base of the container, a rotational actuator coupled to the support surface and operably configured to cause rotation of the support surface about the vertical axis, and at least one actuable clamp disposed to engage a portion of the container to secure the container to the support surface.

The at least one actuable clamp may be spaced apart from the vertical axis and moveable in a generally radial direction toward the vertical axis to engage the container.

The at least one actuable clamp may include two or more actuable clamps each being radially disposed about the vertical axis.

The at least one actuable clamp may include a sliding portion received within an aperture in the support surface for sliding movement in the radial direction, and a protruding portion that protrudes above the support surface and is disposed to engage the container.

The clamp actuator may include an aperture plate disposed below the support surface and having a spiral aperture configured to receive a protrusion associated with the at least one clamp, the aperture being operable to exert a radial force on the protrusion when the plate is rotated for causing the radial motion of the clamp.

The pruning tool may include a plurality of adjacent actuated shearing blades disposed in an arc, the pruning tool being mounted for movement in one or more directions to facilitate positioning of the pruning tool to prune the plant.

The pruning tool may be mounted for movement in at least one of a transverse direction for moving the pruning tool between a deployed position where the pruning tool is disposed to perform pruning operations and a stowed position where the pruning tool is moved to permit a plant and container to be loaded by the manipulator, a direction generally aligned with the vertical axis for disposing the pruning tool at a suitable elevation for pruning operations on plants having differing foliage elevations with respect to the plant support, or a direction toward or away from the vertical axis for disposing the pruning tool at a suitable spacing for pruning operations on plants having differing foliage spread with respect to the vertical axis.

The apparatus may include a repository disposed on the vehicle and providing a storage volume for receiving cuttings removed from the plant by the pruning tool.

The apparatus may include an overflow repository having a wheeled chassis and operably configured to be trailered behind the wheeled chassis of the autonomous vehicle, the overflow repository being in communication with the repository on the autonomous vehicle for receiving clippings.

The repository may include a blower in fluid communication with the storage volume and operable to draw air through at least one repository opening to collect and carry the cuttings via the repository opening into the storage volume.

The pruning tool may include a plurality of adjacent actuated shearing blades disposed generally above the plant support at a plant foliage elevation and the repository opening may include a manifold having a plurality of repository openings, each opening disposed proximate a respective one of the plurality shearing blades, and a conduit extending between the manifold and the storage volume.

The repository may be mounted to the vehicle at a location adjacent to the plant support and the storage volume may extend vertically upward alongside the container and plant when received on the plant support.

The repository may be disposed on the vehicle below the plant support and the storage volume may have an opening peripherally surrounding the plant support for collecting the cuttings.

The opening may include a guide operably configured to direct cuttings toward the opening.

The repository may be removably received on a transverse guide on the chassis to facilitate removal of the repository for emptying clippings from the storage volume.

The apparatus may include a controller operably configured to control the vehicle in response to receiving signals from one or more navigational sensors that provide navigational information and in response to receiving signals from one or more proximity sensors responsive to the presence of containers within the workspace.

The controller may include a processor circuit, a computer readable medium including instructions for directing the processor circuit to receive and respond to the signals produced by the more navigational sensors and one or more proximity sensors.

In accordance with another disclosed aspect there is provided a method for performing pruning operations on plants being cultivated in containers. The method involves (a) causing an autonomous vehicle having a wheeled chassis to autonomously navigate to a location of a plurality of plant containers within a workspace, and (b) locating a first container of the plurality of plant containers at a pickup location and causing a manipulator mounted to the vehicle to grasp and load the container onto a plant support, the plant support being operable to receive and secure the container in an upright condition for rotation about a vertical axis extending generally vertically through the container and the plant. The method also involves (c) causing a pruning tool mounted to the vehicle to prune the plant while the container is rotated on the plant support, and (d) causing the manipulator to grasp and unload the first container to a drop-off location within the workspace. The method further involves (e) successively repeating steps (a) to (d) for remaining containers in the plurality of plant containers.

The drop-off location may be located proximate but separated from the pickup location and the autonomous vehicle and manipulator may be operably configured to arrange the plant containers in regular spaced relation at the drop-off location.

The method may involve causing a controller to control the vehicle in response to receiving signals from one or more navigational sensors that provide navigational information and in response to receiving signals from one or more proximity sensors responsive to the presence of containers within the workspace.

The controller may include a processor circuit including a computer readable medium having instructions for directing the processor circuit to receive and respond to the signals produced by the more navigational sensors and one or more proximity sensors.

Other aspects and features will become apparent to those ordinarily skilled in the art upon review of the following description of specific disclosed embodiments in conjunction with the accompanying figures.

BRIEF DESCRIPTION OF THE DRAWINGS

In drawings which illustrate disclosed embodiments,

FIG. 3A is a front perspective view of a pruning tool and housing of the vehicle apparatus shown in

FIG. 1;

FIG. 3B is a rear perspective view of the pruning tool and housing of the vehicle apparatus shown in

FIG. 1;

DETAILED DESCRIPTION

Figure 1:
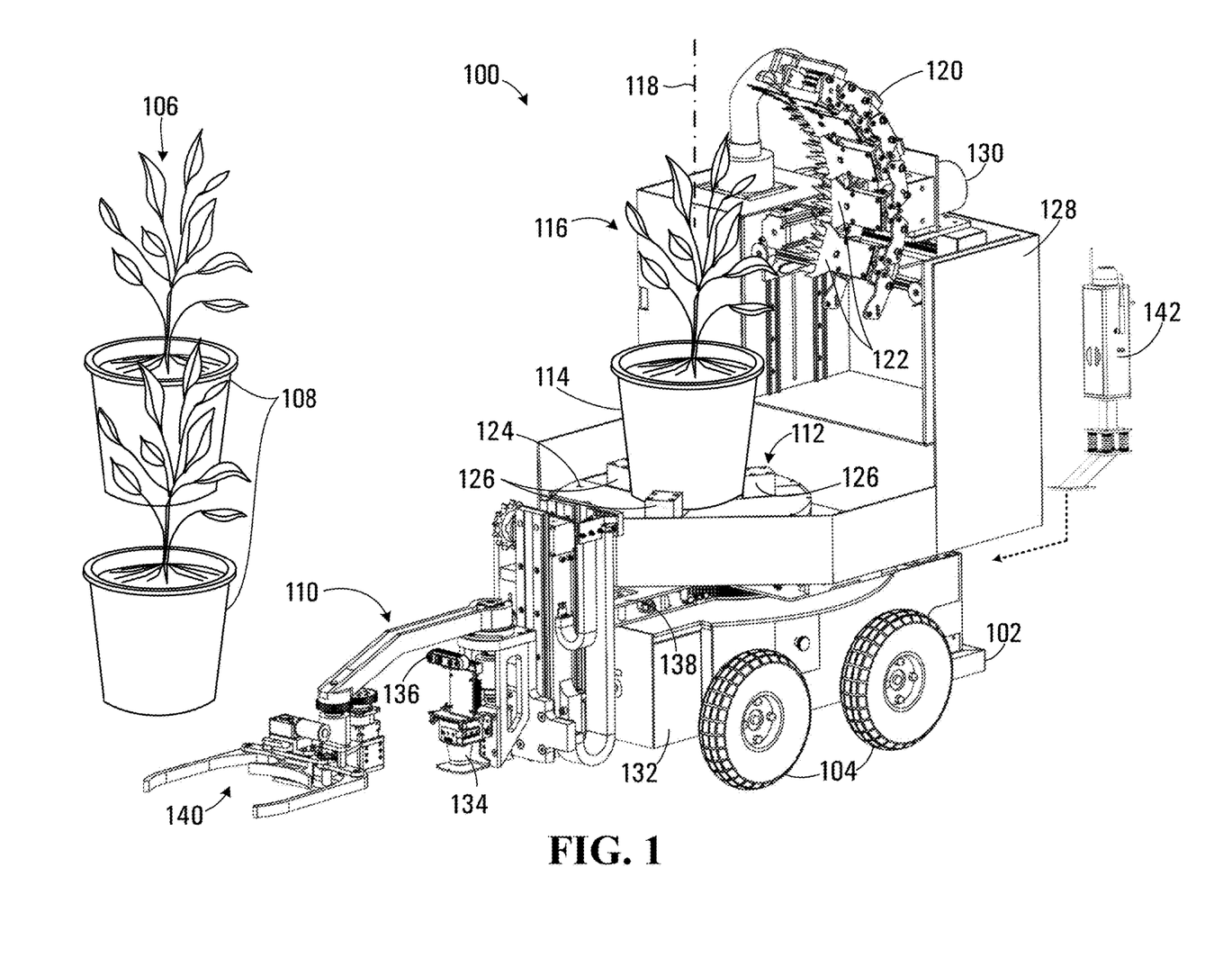
FIG. 1 is a perspective view of an autonomous vehicle apparatus within a workspace in accordance with a first disclosed embodiment.

Referring to FIG. 1, an autonomous vehicle apparatus is shown generally at 100 and includes a wheeled chassis 102 having a pair of drive wheels 104 on each side of the chassis (only one pair of the drive wheels is visible in FIG. 1). The autonomous vehicle 100 is operably configured to autonomously navigate to a location 106 at which a plurality of plant containers 108 are disposed within a workspace. The autonomous vehicle 100 also includes a manipulator 110 mounted to the vehicle and operable to grasp and load one of the containers 108 onto a plant support 112. In the embodiment shown the manipulator 110 includes an end effector 140 having fingers for grasping the containers 108.

One of the plurality of plant containers 108 (i.e. a container 114 in which a plant 116 is being cultivated) has been loaded by the manipulator 110 onto the plant support 112. The container 114 is supported and secured on the plant support 112 in an upright condition. The plant support 112 is also operable to cause rotation of the container 114 about a vertical axis 118 extending generally vertically through the container 114 and the plant 116

The vehicle 100 also includes a pruning tool 120 mounted on the vehicle and disposed to prune the plant 116 while the container 114 is being rotated on the plant support 112. The pruning tool 120 includes a plurality of adjacent shearing blades 122 which are actuated to perform the pruning operations. The shearing blades 122 are disposed in an arc generally above the plant support 112 at foliage elevation of the plant 116. The pruning tool 120 is mounted within a housing 128 mounted rearwardly on the wheeled chassis 102 adjacent to the plant support 112 and is able to move in one or more directions to facilitate positioning of the pruning tool to prune the plant 116. The pruning tool 120 may be implemented using the RAP knife system, available from Packtti of Zwijndrecht, the Netherlands. The RAP knife is available in several blade configurations and includes a pruning shear actuator 130 that drives the blades in a scissor action for performing pruning operations. In other embodiments, the pruning tool 120 may be implemented using a static un-actuated blade that relies on rotation of the container 114 for pruning the foliage of the plant 116.

The vehicle 100 further includes an on-board controller 132 for controlling operations of the autonomous vehicle. The controller 132 may be in communication with various sensors for receiving inputs that permit the vehicle to be navigated by driving the drive wheels 104. For example, in the embodiment shown the vehicle 100 includes a light detection and ranging sensor (LIDAR) 134 and a stereoscopic camera 136 both mounted on the manipulator 110. The LIDAR sensor 134 uses structured laser light to form an image of the location 106 for detecting and operating on objects such as the containers 108. The stereoscopic camera 136 may provide similar functions. In some embodiments the controller 132 may additionally be in communication with wireless sensors 142 mounted on the wheeled chassis 102 that permit connection to a wireless network within the workspace for receiving commands and/or for receiving navigation information for autonomously navigating within the workspace. The wireless sensors 142 may be fixed to a rearward portion of the wheeled chassis 102 and are shown detached in FIG. 1 for sake of illustration. In one embodiment the wireless sensors 142 may include one or more ultra-wide band sensors (UWB) that use low energy short-range radio signals for communicating with UWB navigation beacons disposed within the workspace (not shown). Signals produced by the UWB sensors may be used for navigation of the autonomous vehicle 100 within the workspace.

In the embodiment shown, the manipulator 110 is mounted to a base 138, which is rotatable with respect to the wheeled chassis 102 as described in commonly owned US patent application entitled "MANIPULATOR APPARATUS FOR OPERATING ON ARTICLES" filed on Jul. 12, 2019, which is incorporated herein by reference in its entirety. When attached to the rotatable base 138, the manipulator 110 is able to move about the wheeled chassis 102 without using the drive wheels 104 to reposition the vehicle 100, thus extending an accessible operating range of the manipulator 110 for loading and unloading the containers 108. The movement of the rotatable base 138 is provided independent of the plant support 112, housing 128, and the wheeled chassis 102.

In the embodiment shown the plant support 112 includes a support surface 124, which receives and supports a base of the container 114 and the plant support 112 is sized to support a plurality of different sized containers. In this embodiment the plant support 112 includes a plurality of actuable clamps 126 that are spaced apart from the vertical axis 118 and moveable in a generally radial direction toward the vertical axis to engage and secure the container 114.

Figure 2:
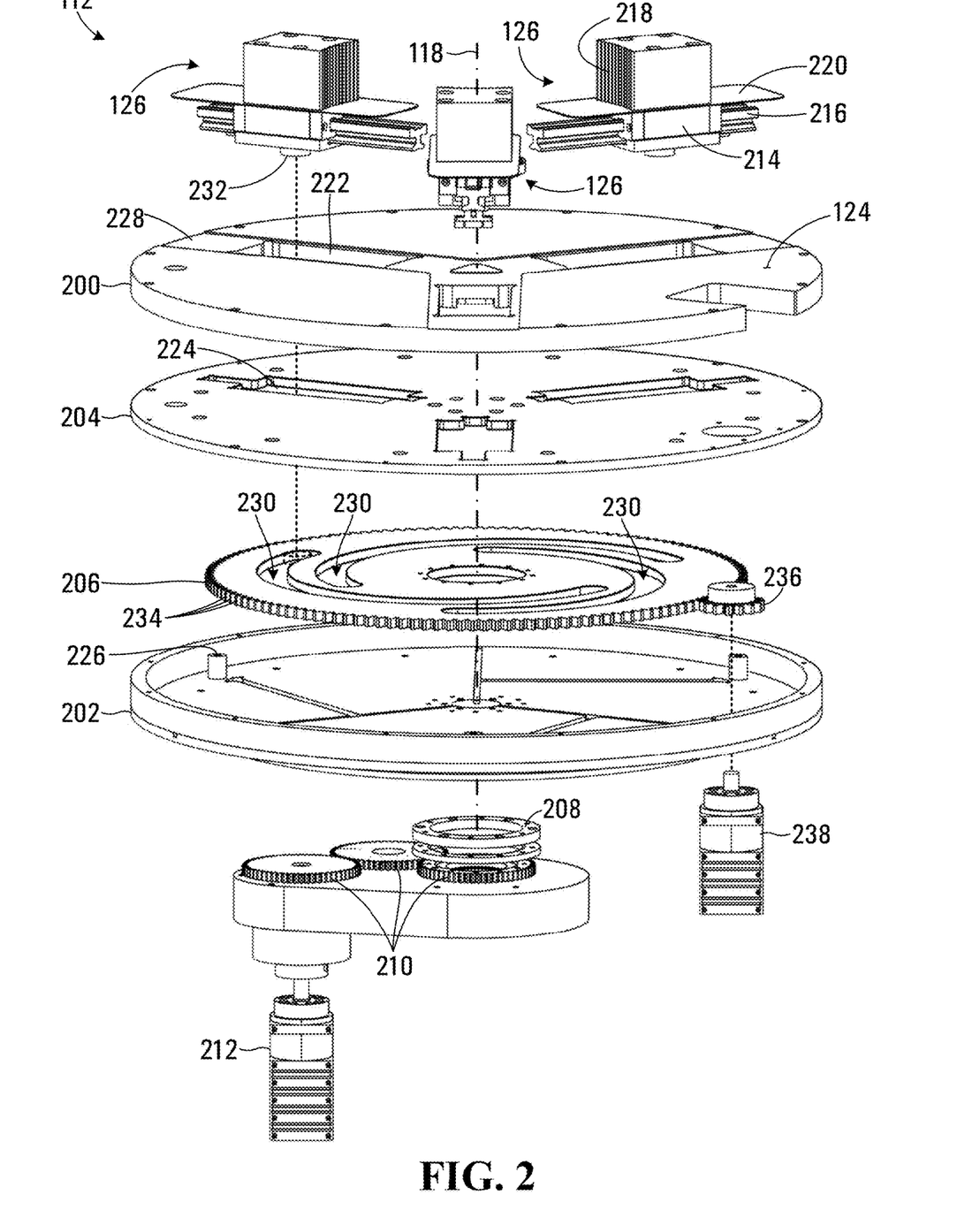
FIG. 2 is an exploded perspective view of components of a plant support of the vehicle apparatus shown in FIG. 1.

Components of the plant support 112 are shown in more detail in exploded perspective view in FIG. 2. Referring to FIG. 2, the plant support 112 includes a top plate 200 and a base plate 202. The top plate 200 provides the support surface 124 that supports the container 114. An intermediate plate 204 underlying the top plate 200 and an aperture plate 206 sandwiched between the top plate and base plate 202. The base plate 202 is mounted on a flange 208 coupled via a gear train 210 to a plant support actuator 212 operably configured to cause rotation of the top plate 200 and support surface 124 about the vertical axis 118.

Each actuable clamp 126 includes a clamp base 214 slideably received on and moveable along a guide rail 216 in the radial direction with respect to the vertical axis 118. A clamp jaw 218 is attached to the clamp base 214 and when the plant support 112 is assembled, the clamp jaw protrudes above the support surface 124. The top plate 200 and intermediate plate 204 each include corresponding apertures 222 and 224 that permit movement of the clamp base 214 within the support surface 124. Each guide rail 216 is fixed to the base plate 202 via a post 226. The clamp 126 further includes a cover plate 220 that slides within a recess 228 in the support surface 124 and covers the aperture 222 in the top plate 200 to prevent debris from passing through the aperture. The clamp base 214 thus acts as a sliding portion of the clamp 126 and is thus able to slide along the guide rail 216 within the recess 228 and aperture 222. The clamp jaw 218 provides a protruding portion of the clamp 126 that protrudes above the support surface 124 and is disposed to engage the container 114 when moved in a radially oriented direction toward the vertical axis 118.

The aperture plate 206 includes a spiral aperture 230 for each clamp 126. The spiral aperture 230 is disposed to receive a bushing 232 protruding downwardly from the clamp base 214. The aperture plate 206 includes gear teeth 234 formed in an outer periphery of the aperture plate, which are configured to mesh with a toothed drive sprocket 236. The drive sprocket 236 is coupled to a clamp actuator 238 disposed within the wheeled chassis 102 that delivers a torque to the drive sprocket 236 for rotating the aperture plate 206. Rotation of the aperture plate 206 causes a generally radial force to be exerted on the bushing 232 for actuating the radial motion of the clamp 126. For the embodiment shown, rotation of the aperture plate 206 in a clockwise direction causes each of the clamps 126 to move radially inwardly toward the vertical axis 118 to engage the container 114. Similarly, rotation of the aperture plate 206 in an anti-clockwise direction causes each of the clamps 126 to move radially outward away from the vertical axis 118 to release the container 114.

In the embodiment shown, each of the clamps 126 has a corresponding spiral aperture 230 within the aperture plate 206 and rotation of the aperture plate causes simultaneous motion of the clamps in the radial direction toward or away from the vertical axis 118. In other embodiments, the plant support 112 may be implemented using a different clamping arrangement. For example, one of the three clamps shown in FIG. 2 may be eliminated in favor of a dual actuated clamping arrangement. Alternatively, two of the actuable clamps shown in FIG. 2 may be replaced by a fixed protruding rim, and a single actuable clamp may be used to secure the container 114 against the protruding rim. More than three clamps generally configured as shown in FIG. 2 may alternatively be implemented to secure the container 114. In other embodiments the clamps may be otherwise configured and actuated.

Figure 3A:
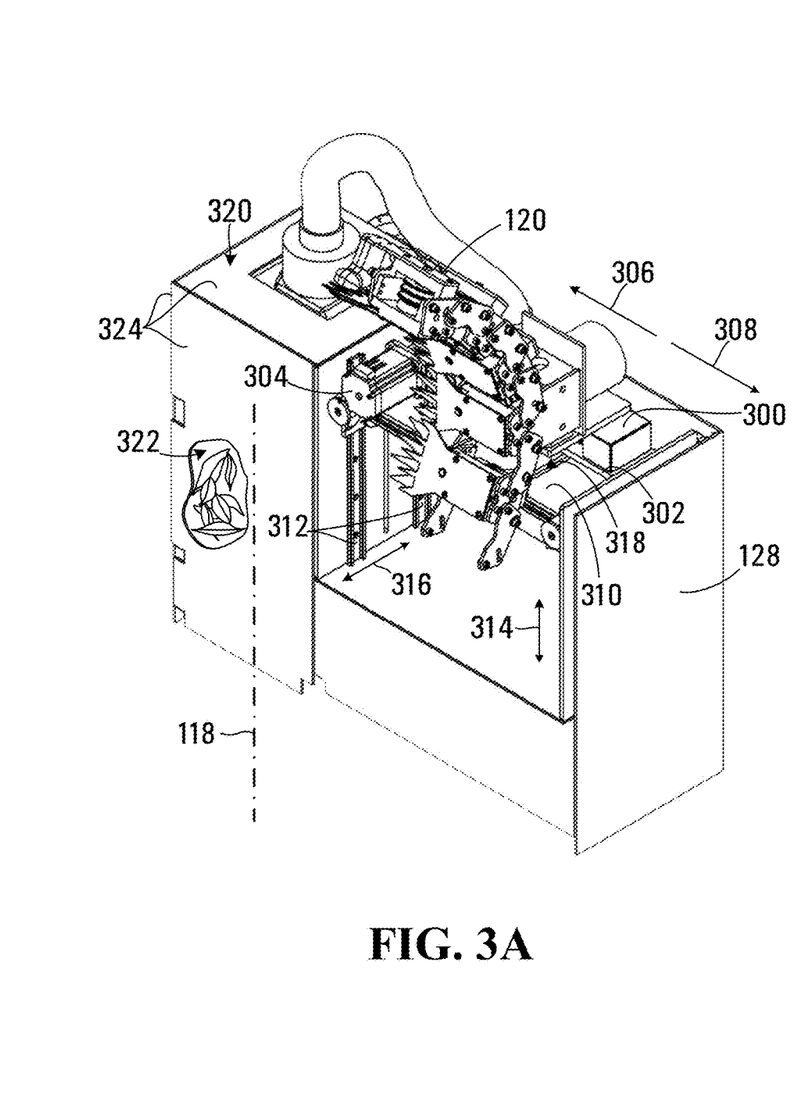
Figure 3B:
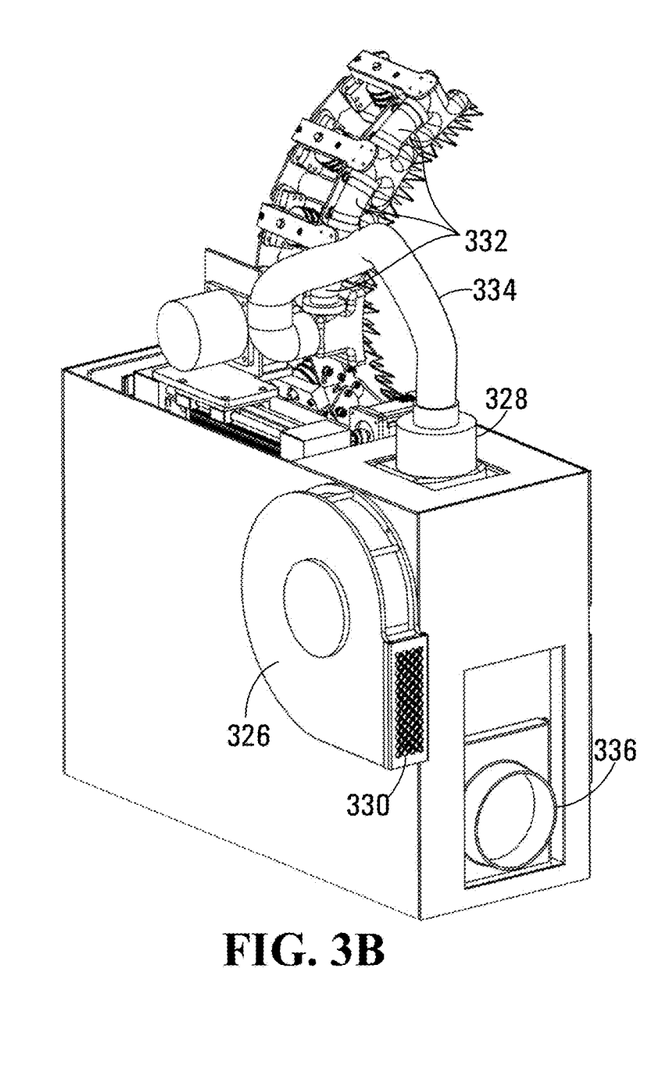

The housing 128 and the pruning tool 120 are shown in isolation in FIG. 3A and FIG. 3B. Referring to FIG. 3A, the pruning tool 120 is mounted on a carriage 300 received on transversely oriented tracks 302. Movement of the carriage 300 is actuated by a pruner translation actuator 304 coupled to a linear drive stage (not shown) that causes transverse movement of the carriage on the tracks 302 in a direction indicated by the arrows 306 and 308. The transverse movement 306 allows the pruning tool 120 to be moved in the direction 306 to a deployed position, where the pruning tool is disposed to perform pruning operations on the plant 116. Transverse movement in an opposite direction 308 facilitates movement of the pruning tool 120 to a stowed position, where the pruning tool is spaced away from the plant 116 and container 114 for loading of the container on the plant support 112 by the manipulator 110. In some embodiments the carriage 300 may be omitted and the pruning tool 120 may remain in the deployed position during loading of the container 114.

The carriage 300 and tracks 302 are supported on a platform 310 mounted on rails 312. The rails 312 permit the platform 310 to be moved vertically in a direction shown by an arrow 314 generally aligned with the vertical axis 118. The vertical movement facilitates positioning of the pruning tool 120 at a suitable elevation for pruning operations on the plant 116. In the embodiment shown the vertical motion 314 is performed manually by releasing clamps and positioning the platform 310 at an appropriate height for the plants being pruned. Plants at the same stage of cultivation may generally be pruned with the pruning tool 120 set at a fixed elevation. The elevation may subsequently be adjusted for other plants at differing stages of cultivation. In other embodiments the vertical motion 314 may be actuated by a motor or other actuator to perform an automated adjustment of the elevation of the pruning tool 120.

The pruning tool 120 is also moveable in a direction 316 toward or away from the vertical axis 118 for disposing the pruning tool at a suitable spacing for pruning operations on plants having differing foliage spread with respect to the vertical axis 118. In this embodiment, the carriage 300 is moveable within slots in the platform 310 (one of which is visible at 318 in FIG. 3) and the spacing is adjusted by releasing a clamp (not shown) and sliding the carriage 300 forwardly or rearwardly with respect to the vertical axis 118.

Still referring to FIG. 3A, the housing 128 also includes a repository 320 that provides a storage volume 322 for receiving cuttings removed from the plant 116 by the pruning tool 120. The storage volume is defined within panels 324 of the housing 128 and extends vertically upward alongside the vertical axis 118. The housing 128 is shown in rear perspective view in FIG. 3B. Referring to FIG. 3B, the repository 320 includes a blower 326 in fluid communication with the storage volume 322. The repository 320 also includes a repository opening 328 to the storage volume 322 and the blower 326 is operable to draw air through the repository opening and storage volume to produce an airflow for carrying clippings into the storage volume. The airflow is discharged to the environment through an exhaust port 330. In this embodiment the repository opening 328 includes a manifold 332 that provides a plurality of repository openings at the pruning tool 120. Each opening is disposed proximate a respective one of the plurality shearing blades 122 and a conduit 334 extends between the manifold and the storage volume. Clippings generated by each of the shearing blades 122 are thus locally collected and directed through the repository opening 328 to the storage volume 322. Clippings accumulate in the storage volume 322 and are prevented from being discharged through the exhaust port 330 by placing a grid over an intake of the blower 326. The accumulated clippings may be removed from the storage volume 322 through a clipping discharge port 336 by hand or vacuumed out via a large bore conduit connected to the discharge port.

Figures 4A, 4B:
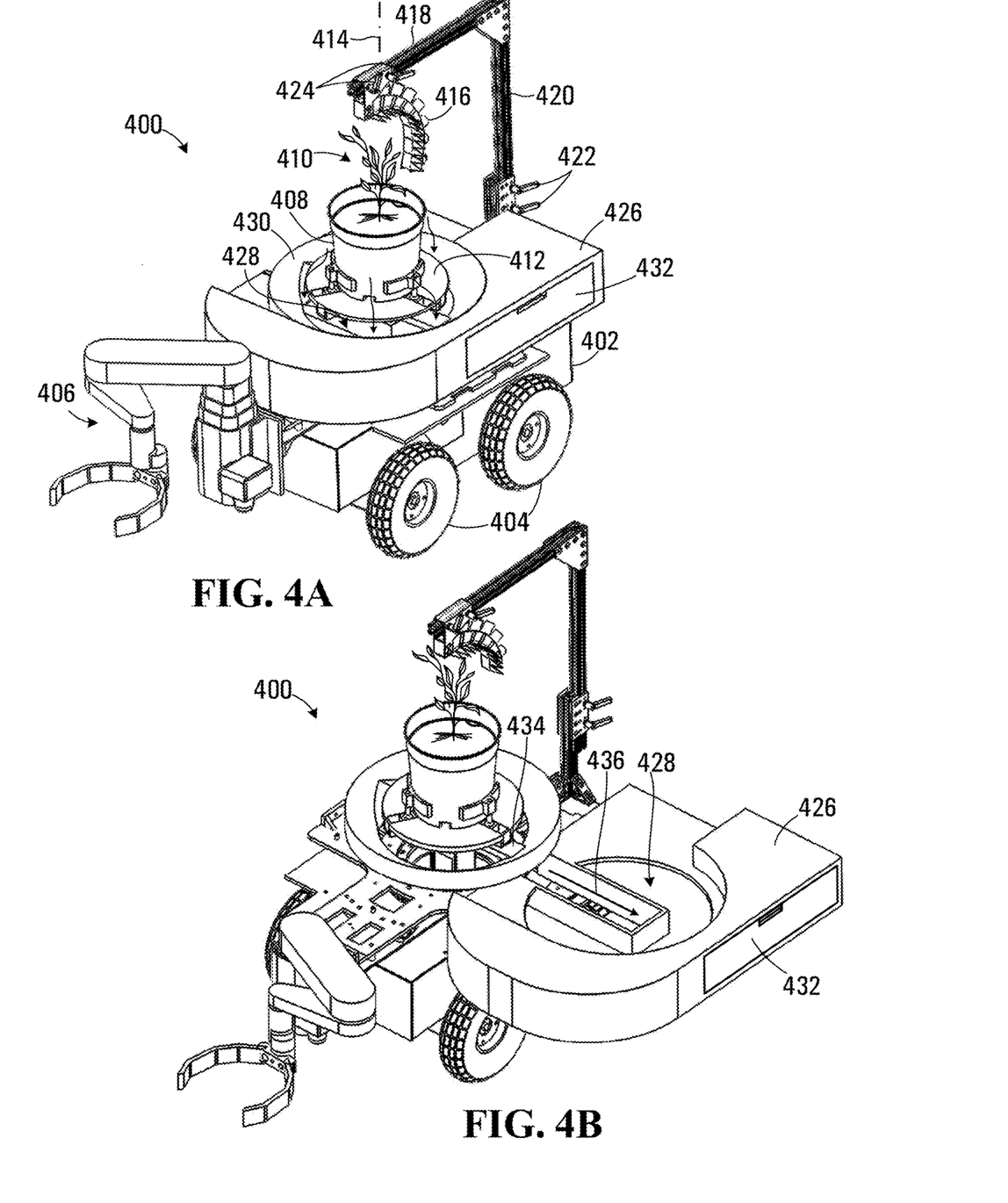
FIG. 4A is a perspective view of an autonomous vehicle apparatus in accordance with another disclosed embodiment.
FIG. 4B is a perspective view of the autonomous vehicle apparatus shown in FIG. 4A with a clipping repository removed.

Referring to FIG. 4A, another autonomous vehicle apparatus embodiment is shown generally at 400 and includes a wheeled chassis 402 having a pair of drive wheels 404 on each side of the chassis (only one pair of the drive wheels is visible in FIG. 4A). The vehicle 400 also includes a manipulator 406 mounted to the vehicle and operable to grasp and load a container 408 and plant 410 onto a plant support 412. The plant support 412 is operable to secure the container 408 and cause rotation of the container about a vertical axis 414 generally as described above in connection with the embodiment shown in FIG. 1. The vehicle 400 also includes a pruning tool 416, which is mounted to the wheeled chassis 402 via a boom 418 and a post 420. In this embodiment the pruning tool 416 is not transversely moveable, but may be manually raised or lowered by unlocking a pair of clamps 422 and adjusting the height of the post 420. Similarly the pruning tool 416 may be manually moved toward or away from the container 408 and plant 410 by unlocking a pair of clamps 424 on the boom 418 and moving the pruning tool 416 on the boom.

The vehicle 400 includes a repository 426 disposed on the wheeled chassis 102 of the vehicle generally below the plant support 112. When the plant 410 is pruned, clippings will for most part fall towards the plant support 112 and enter an opening 428 peripherally surrounding the plant support. The opening 428 is in communication with a storage volume within the repository 426 for collecting the cuttings. In the embodiment shown the repository 426 further includes an annular guide 430, which is angled to direct cuttings toward the opening 428. The repository 426 also includes a hinged flap 432 that can be opened to permit access to the storage volume for removing accumulated clippings.

Referring to FIG. 4B, in one embodiment the repository 426 may be removably received on a transverse guide 434 on the wheeled chassis 102 of the vehicle 400. The transverse guide 434 permits that repository 426 to be removed by sliding out the repository in the direction indicated by the arrow 436. Once removed the, repository 426 may be turned upside down to emptying clippings through the opening 428 or the clipping may be discharged via the hinged flap 432.

Figure 4C:
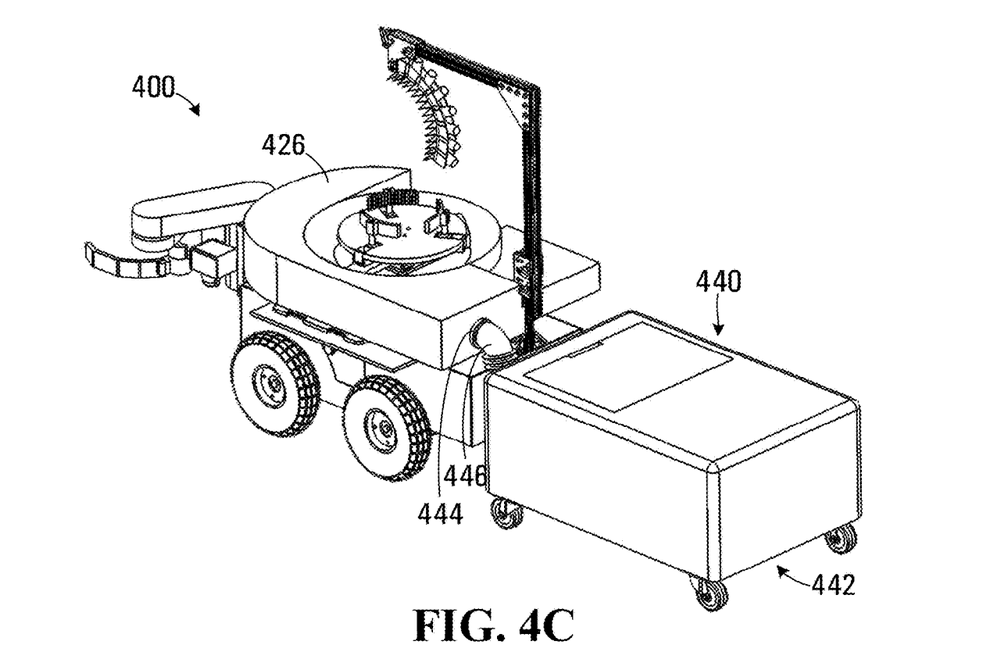
FIG. 4C is a perspective view of the autonomous vehicle apparatus shown in FIG. 4A and a trailered overflow clipping repository.

Referring to FIG. 4C, in another embodiment an overflow repository 440 having a wheeled chassis 442 may be trailered behind the vehicle 400. The overflow repository 440 may be coupled to a hitch (not shown) on the wheeled chassis 402 of the vehicle 400. In this embodiment the repository 426 on the vehicle 400 has a discharge opening 444 and the overflow repository 440 is in communication with the repository via a flexible duct 446 for receiving overflow clippings from the repository 426. The overflow repository 440 provides an additional storage volume for accumulating clippings thus reducing the required frequency of emptying of the repository 426.

Figure 5:
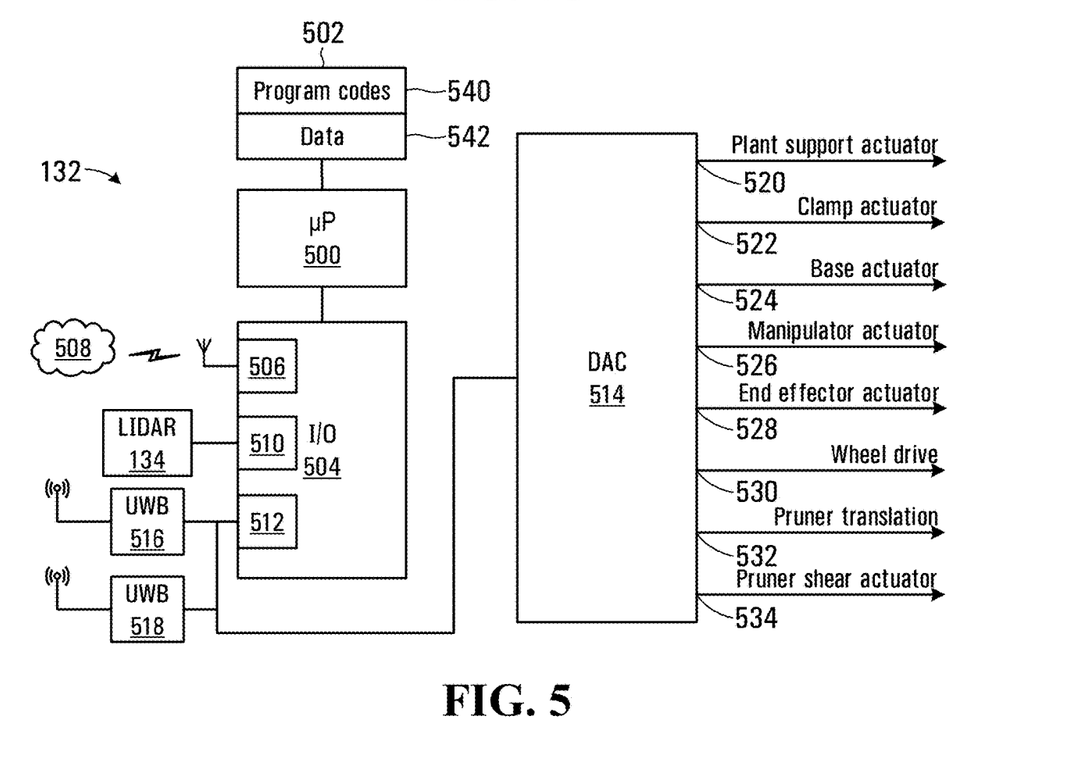
FIG. 5 is a block diagram of a processor circuit for implementing an on-board controller of the FIG. 6 is a flowchart depicting blocks of code for directing the processor circuit of FIG. 5 to control loading, pruning, and unloading operations of the vehicle apparatus shown in FIG. 1.

A block diagram of the on-board controller 132 (FIG. 1) is shown in more detail in FIG. 5 and may be implemented using an embedded processor circuit such as a Microsoft Windows® industrial PC. Referring to FIG. 5, the controller 132 includes a microprocessor 500, a computer readable medium or memory 502, and an input output (I/O) 504, all of which are in communication with the microprocessor 500. The I/O 504 includes a wireless interface 506 (such as an IEEE 802.11 interface) for wirelessly receiving and transmitting data communication signals between the controller 132 and a network 508 within the workspace. The I/O 504 also includes a wired network interface 510 (such as an Ethernet interface) for connecting to the LIDAR sensor 134 (shown in FIG. 1). The I/O 504 further includes a USB interface 512 for connecting to a digital to analog converter (DAC) 514 and to a pair of ultra-wideband transceivers (UWB) 516 and 518 used for autonomous navigation of the vehicle 100.

The DAC 514 includes a plurality of ports for receiving analog signals and converting the analog signals into digital data representing the signals and/or producing analog control signals. In the embodiment shown the DAC 514 includes a port 520 for producing control signals for controlling the plant support actuator 212 to cause rotation of the plant support 112 an a port 522 for producing control signals for actuating the clamps 126. The DAC 514 also includes a port 524 for producing control signals for controlling rotation of the rotatable base 138 on which the manipulator 110 is mounted. The DAC 514 also includes a port 526 for producing control signals for controlling the manipulator 110 and a port 528 for producing control signals for controlling the end effector 140. The DAC 514 also includes a port 530 for producing control signals for controlling the drive wheels 104 for moving and steering the wheeled chassis 102 of the vehicle 100. The DAC 514 also includes a port 532 for producing control signals for controlling the pruner translation actuator 304 to move the pruning tool 120 between the deployed position and the stowed position. The DAC 514 further includes a port 534 for producing control signals for activating the shearing blades 122 of the pruning tool 120.

Program codes for directing the microprocessor 500 to carry out various functions are stored in a location 540 of the memory 502, which may be implemented as a flash memory, for example. The program codes 540 direct the microprocessor 500 to implement an operating system (such as Microsoft Windows for example) and to perform various other system functions associated with operation of the apparatus 100. The memory 502 also includes data storage locations 542 for storing data associated with operation of the autonomous vehicle 100.

Figure 6:
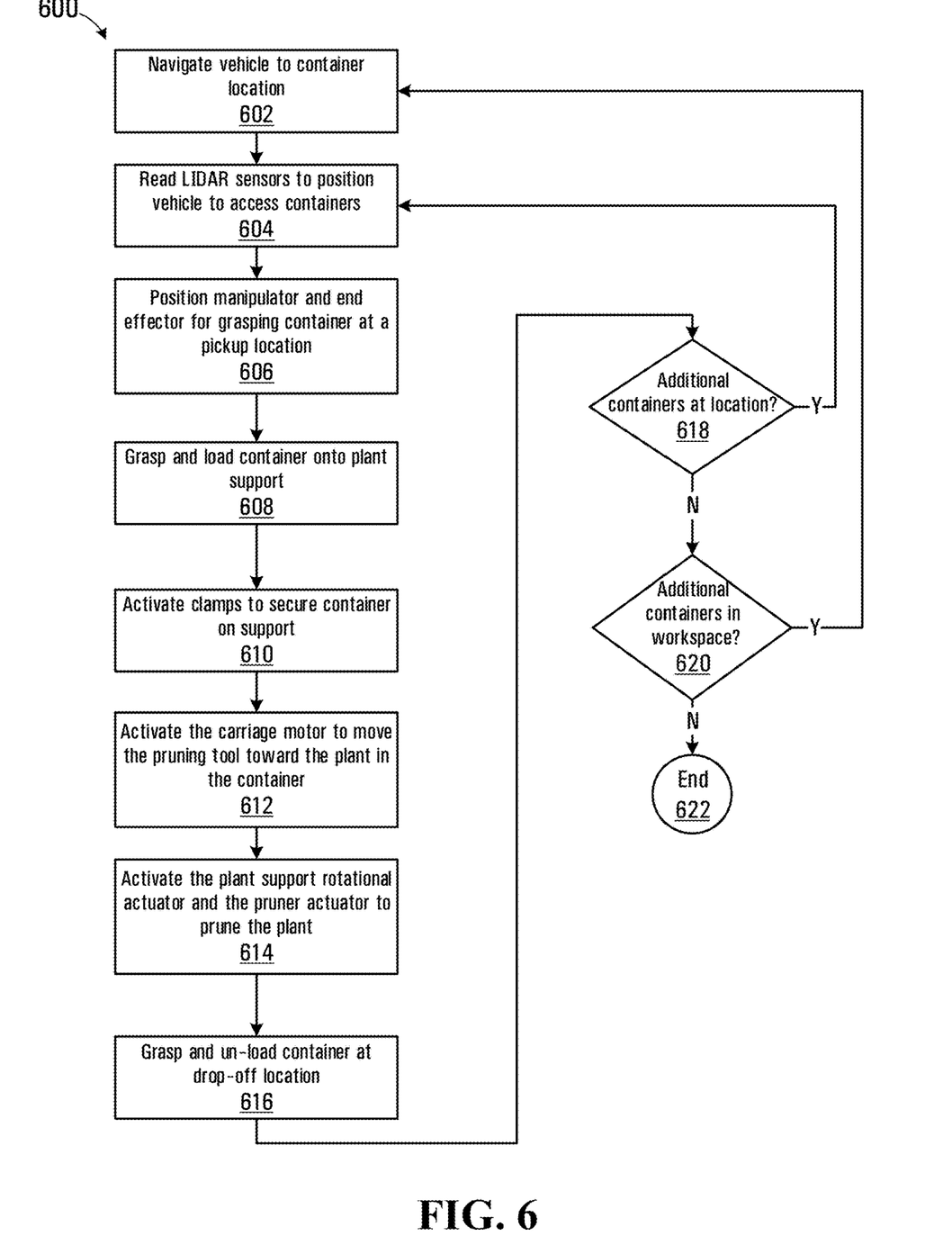

Referring to FIG. 6, a flowchart depicting blocks of code for directing the controller processor circuit 132 to control loading and pruning operations of the apparatus 100 is shown at 600. The blocks generally represent codes that may be read from the program codes location 540 of the memory 502 for directing the microprocessor 500 to perform various functions. The actual code to implement each block may be written in any suitable program language, such as C, C++, C #, Java, and/or assembly code, for example.

The process begins at block 600, which directs the microprocessor 500 of the controller 132 to navigate the vehicle to the location 106 where the containers 108 are located (shown in FIG. 1). Block 602 thus directs the microprocessor 500 to read navigation signals from the UWB 516 and 518 and based on the navigation signals to produce wheel drive signals at the port 530 of the DAC 514 for controlling the wheels of the autonomous vehicle 100 to drive to the location 106. Block 604 then directs the microprocessor 500 to read the LIDAR sensor 134 and to position the manipulator 110 and end effector 140 for accessing the containers 108 at the pick-up location. Block 604 may also direct the microprocessor 500 to produce signals at the port 524 of the DAC 514 for causing the base 138 to rotate to position the manipulator 110 with respect to the container 114 being loaded. Block 606 then directs the microprocessor 500 to position the end effector 140 for grasping the container 114 based on the signals received from the LIDAR sensor 134.

The process 600 then continues at block 608, which directs the microprocessor 500 to produce signals at the port 528 of the DAC 514 to cause the end effector 140 to grasp the container 114. Block 608 also directs the microprocessor 500 to produce signals at the port 526 of the DAC 514 for causing the manipulator 110 to load the container 114 onto the plant support 112. Block 610 then directs the microprocessor 500 to cause the DAC 514 to produce signals at the port 522 for actuating the clamp actuator 238, which causes rotation of the aperture plate 206 and causes the clamps 126 to close to secure the container 114 on the plant support 112.

The process 600 then continues at block 612, which directs the microprocessor 500 to cause signals to be generated at the port 532 of the DAC 514 that cause the carriage 300 to move the pruning tool 120 from the stowed position to the deployed position. Block 614 then directs the microprocessor 500 to cause the DAC 514 to produce signals at the port 520 to cause rotation of the plant support 112, the container 114, and the plant 116. Block 614 also directs the microprocessor 500 to cause the DAC 514 to produce signals at the port 534 that activate the pruning shear actuator 130 to cause the shearing blades 122 to begin pruning operations. The plant 116 may be rotated through one or more rotations of the plant support 112 while the foliage and/or shoots are pruned.

The process then continues at block 616, which directs the microprocessor 500 to grasp and unload the container 114 at a drop-off location. As such block 616 directs the microprocessor 500 to cause the DAC 514 to produce signals for a series of operations, such as causing the clamps 126 to release to facilitate unloading of the container 114, causing the manipulator 110 to move to permit the end effector 140 to grasp the container, moving the rotatable base 138 to access the drop-off location, and placing the container at the drop-off location.

Block 618 then directs the microprocessor 500 to determine whether there are more containers 108 at the location 106 that require pruning operations on the plants being cultivated in the containers. If at block 618, there remain containers at the location 106 to be processed, the microprocessor 500 is directed back to block 604 and blocks 604-618 are repeated. If at block 618, there are no further containers 108, the microprocessor 500 is directed to block 620. Block 620 then directs the microprocessor 500 to determine whether there are more containers within the workspace at another location that require pruning operations on the plants being cultivated in the containers. If at block 620, there remain containers in the workspace to be processed, the microprocessor 500 is directed back to block 602 and blocks 602-618 are repeated.

Figures 7A, 7B:
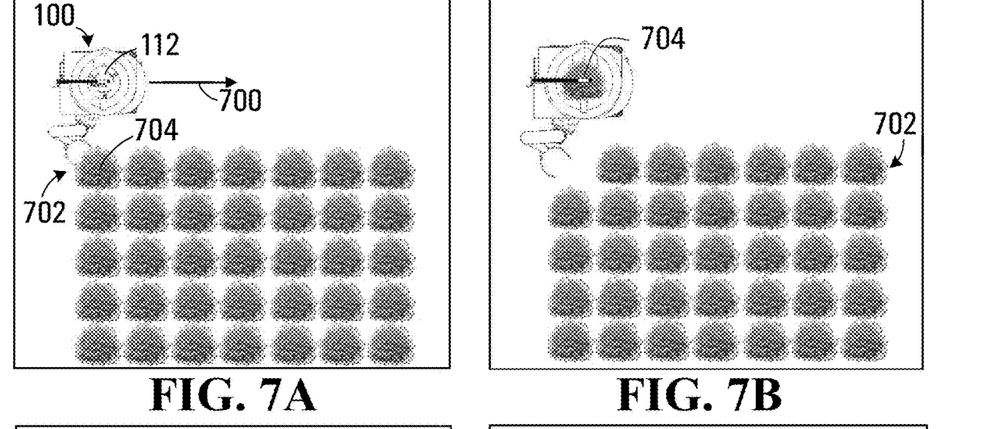
FIG. 7A-7F are a series of plan views of a workspace in which the process shown in FIG. 6 is implemented.

The autonomous vehicle 100 thus navigates to a new location where there are containers and plants to be pruned. If at block 620, there are containers within the workspace that require pruning, the microprocessor 500 is directed back to block 622 and the process 600 ends. An example of the implementation of the process 600 is shown as a series of plan views of a workspace in FIGS. 7A-7F. Referring to FIG. 7A, the autonomous vehicle 100 is navigated in a direction indicated by an arrow 700, where the manipulator 110 and end effector 140 have access to a first plurality of containers 702 on a right had side of the vehicle. The autonomous vehicle 100 navigates to a first container 704 in the first plurality of containers 702 and the manipulator 110 and end effector 140 are activated as shown in blocks 604-610 of the process 600 to load the container 704 onto the plant support 112 of the vehicle.

Figures 7C, 7D:
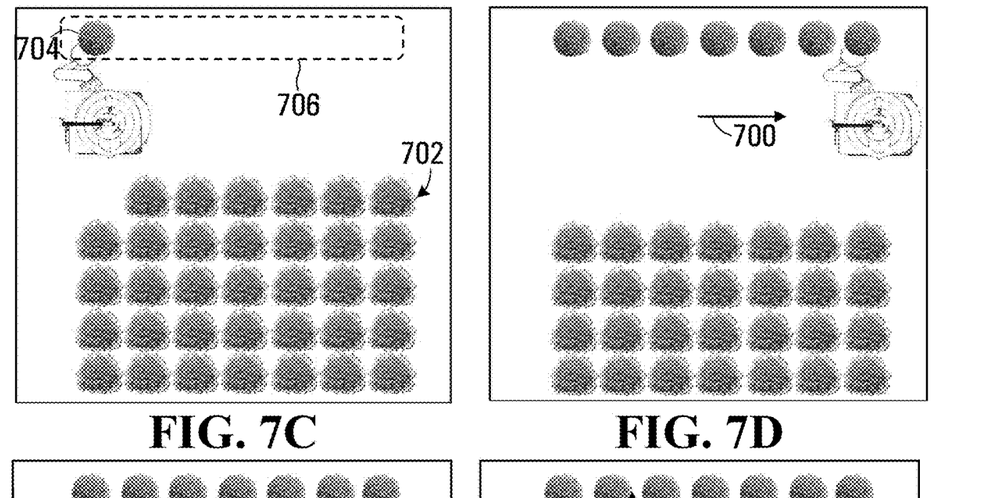

In FIG. 7B, the loading of the first container 704 has been completed and a plant in the container is pruned in accordance with blocks 612-614 of the process 600. In FIG. 7C, the container 704 is then unloaded in accordance with block 616 at a drop-off location 706 on a left hand side of the vehicle 100.

The vehicle 100 then executes block 618 of the process 600 and determines that there are additional reachable containers in the first plurality of containers 702 aligned along the direction 700 and repeats blocks 604-616 for these containers.

Referring to FIG. 7D, at some time the vehicle 100 will no longer be able to reach the next container in the first plurality of containers 702 and the block 620 causes the vehicle to execute block 602 to move the vehicle in the direction 700 to access further containers in the first plurality of containers. Blocks 604-616 are then executed until all of the remaining containers in the first plurality of containers 702 have been pruned and placed at the drop-off location 706.

Figures 7E, 7F:
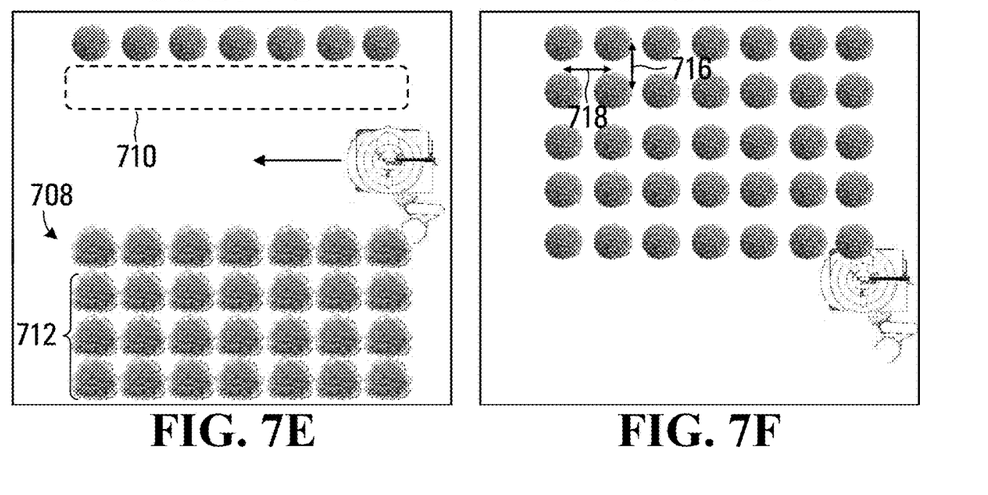

Referring to FIG. 7E, when the autonomous vehicle 100 has completed operations on the first plurality of containers 702, block 602 is again executed to cause the vehicle to turn around and navigate to place a second plurality of containers 708 on the left hand side of the vehicle. The process then continues generally as described above until the second plurality of containers 708 have been placed at a drop-off location 710. A remaining plurality of containers 712 will be similarly processed.

Referring to FIG. 7F, when all of the containers 702, 708, and 712 have been processed as described above, the processed containers have been relocated to the drop-off location. In some embodiments a vertical distance 716 and horizontal distance 718 spacing between the unloaded pruned plant containers may differ from an original spacing of the containers as shown in FIG. 7A. The autonomous vehicle 100 may thus prune and re-space the containers at the same time. Similarly, the containers in FIG. 7A could also have been irregularly positioned and following the pruning operation may be regularly spaced as shown in FIG. 7F.

In the embodiments described above, the manipulator 110 and manipulator 406 are shown implemented as a selective compliance assembly robot arm (SCARA) manipulator, but in other embodiments may be implemented using other manipulator configurations.

While specific embodiments have been described and illustrated, such embodiments should be considered illustrative only and not as limiting the disclosed embodiments as construed in accordance with the accompanying claims.

What is claimed is:

1. An autonomous vehicle apparatus for performing pruning operations on a plant being cultivated in a container, the apparatus comprising:
   a wheeled chassis operably configured to autonomously navigate to a location of the container within a workspace;
   a plant support operable to receive and secure the container in an upright condition for rotation about a vertical axis extending generally vertically through the container and the plant;
   a manipulator mounted to the vehicle and operable to grasp and load the container onto the plant support;
   a pruning tool mounted on the vehicle and disposed to prune the plant while the container is rotated on the plant support.

2. The apparatus of claim 1 wherein the plant support comprises:
   a support surface sized to receive and support a base of the container;
   a rotational actuator coupled to the support surface and operably configured to cause rotation of the support surface about the vertical axis; and
   at least one actuable clamp disposed to engage a portion of the container to secure the container to the support surface.

3. The apparatus of claim 2 wherein the at least one actuable clamp is spaced apart from the vertical axis and moveable in a generally radial direction toward the vertical axis to engage the container.

4. The apparatus of claim 3 wherein the at least one actuable clamp comprises two or more actuable clamps each being radially disposed about the vertical axis.

5. The apparatus of claim 3 wherein the at least one actuable clamp comprises:
   a sliding portion received within an aperture in the support surface for sliding movement in the radial direction; and
   a protruding portion that protrudes above the support surface and is disposed to engage the container.

6. The apparatus of claim 3 wherein the clamp actuator comprises an aperture plate disposed below the support surface and having a spiral aperture configured to receive a protrusion associated with the at least one clamp, the aperture being operable to exert a radial force on the protrusion when the plate is rotated for causing the radial motion of the clamp.

7. The apparatus of claim 1 wherein the pruning tool comprises a plurality of adjacent actuated shearing blades disposed in an arc, the pruning tool being mounted for movement in one or more directions to facilitate positioning of the pruning tool to prune the plant.

8. The apparatus of claim 7 wherein the pruning tool is mounted for movement in at least one of:
   a transverse direction for moving the pruning tool between a deployed position where the pruning tool is disposed to perform pruning operations and a stowed position where the pruning tool is moved to permit a plant and container to be loaded by the manipulator;
   a direction generally aligned with the vertical axis for disposing the pruning tool at a suitable elevation for pruning operations on plants having differing foliage elevations with respect to the plant support; or
   a direction toward or away from the vertical axis for disposing the pruning tool at a suitable spacing for pruning operations on plants having differing foliage spread with respect to the vertical axis.

9. The apparatus of claim 1 further comprising a repository disposed on the vehicle and providing a storage volume for receiving cuttings removed from the plant by the pruning tool.

10. The apparatus of claim 9 further comprising an overflow repository having a wheeled chassis and operably configured to be trailered behind the wheeled chassis of the autonomous vehicle, the overflow repository being in communication with the repository on the autonomous vehicle for receiving clippings.

11. The apparatus of claim 9 wherein the repository comprises a blower in fluid communication with the storage volume and operable to draw air through at least one repository opening to collect and carry the cuttings via the repository opening into the storage volume.

12. The apparatus of claim 11 wherein the pruning tool comprises a plurality of adjacent actuated shearing blades disposed generally above the plant support at a plant foliage elevation and wherein the repository opening comprises:
   a manifold having a plurality of repository openings, each opening disposed proximate a respective one of the plurality shearing blades; and
   a conduit extending between the manifold and the storage volume.

13. The apparatus of claim 9 wherein the repository is mounted to the vehicle at a location adjacent to the plant support and the storage volume extends vertically upward alongside the container and plant when received on the plant support.

14. The apparatus of claim 9 wherein the repository is disposed on the vehicle below the plant support and the storage volume has an opening peripherally surrounding the plant support for collecting the cuttings.

15. The apparatus of claim 14 wherein the opening comprises a guide operably configured to direct cuttings toward the opening.

16. The apparatus of claim 14 wherein the repository is removably received on a transverse guide on the chassis to facilitate removal of the repository for emptying clippings from the storage volume.

17. The apparatus of claim 1 further comprising a controller operably configured to control the vehicle in response to receiving signals from one or more navigational sensors that provide navigational information and in response to receiving signals from one or more proximity sensors responsive to the presence of containers within the workspace.

18. The apparatus of claim 17 wherein the controller comprises:
- a processor circuit;
- a computer readable medium including instructions for directing the processor circuit to receive and respond to the signals produced by the more navigational sensors and one or more proximity sensors.

19. A method implemented by a controller of an autonomous vehicle having a wheeled chassis to perform pruning operations on plants being cultivated in containers, the method comprising:
- (a) causing the autonomous vehicle to autonomously navigate to a location of a plurality of plant containers within a workspace;
- (b) locating a first container of the plurality of plant containers at a pickup location and causing a manipulator mounted to the vehicle to grasp and load the container onto a plant support, the plant support being operable to receive and secure the container in an upright condition for rotation about a vertical axis extending generally vertically through the container and the plant;
- (c) causing a pruning tool mounted to the vehicle to prune the plant while the container is rotated on the plant support;
- (d) causing the manipulator to grasp and unload the first container to a drop-off location within the workspace;
- (e) successively repeating steps (a) to (d) for remaining containers in the plurality of plant containers.

20. The method of claim 19 wherein the drop-off location is located proximate but separated from the pickup location and wherein the autonomous vehicle and manipulator are operably configured to arrange the plant containers in regular spaced relation at the drop-off location.

21. The method of claim 19 further comprising causing a controller to control the vehicle in response to receiving signals from one or more navigational sensors that provide navigational information and in response to receiving signals from one or more proximity sensors responsive to the presence of containers within the workspace.

22. The method of claim 21 wherein the controller comprises a processor circuit including a computer readable medium having instructions for directing the processor circuit to receive and respond to the signals produced by the more navigational sensors and one or more proximity sensors.

* * * * *